(12) United States Patent
Parker et al.

(10) Patent No.: US 7,875,184 B2
(45) Date of Patent: Jan. 25, 2011

(54) CRYSTALLIZED PELLET/LIQUID SEPARATOR

(75) Inventors: Kenny Randolph Parker, Afton, TN (US); Robert Lin, Kingsport, TN (US); Raymond Isaac, Gray, TN (US); Duane Alan Hall, Lexington, SC (US)

(73) Assignee: Eastman Chemical Company, Kingsport, TN (US)

( * ) Notice: Subject to any disclaimer, the term of this patent is extended or adjusted under 35 U.S.C. 154(b) by 977 days.

(21) Appl. No.: 11/501,606

(22) Filed: Aug. 9, 2006

(65) Prior Publication Data

US 2007/0062872 A1    Mar. 22, 2007

Related U.S. Application Data

(60) Provisional application No. 60/719,533, filed on Sep. 22, 2005.

(51) Int. Cl.
*B01D 61/00* (2006.01)
*B01D 63/00* (2006.01)
*B01D 24/00* (2006.01)

(52) U.S. Cl. .................. 210/650; 210/651; 210/652; 210/323.2; 210/361.6; 210/321.78

(58) Field of Classification Search ......... 210/650–651, 210/321.2, 193.1, 195.2, 652, 321.6, 321.78, 210/437; 528/486, 499, 503; 264/211.13, 264/176.1, 219; 34/168, 320
See application file for complete search history.

(56) References Cited

U.S. PATENT DOCUMENTS 2,401,754 A    6/1946    Green (Continued)

FOREIGN PATENT DOCUMENTS

CA    2340358    1/2001

(Continued)

OTHER PUBLICATIONS

International Search Report and Written Opinion of the International Searching Authority for Corresponding PCT Application PCT/US2006/035364.

(Continued)

*Primary Examiner*—Ana M Fortuna
(74) *Attorney, Agent, or Firm*—Jennifer R. Knight; Bernard J. Graves, Jr.

(57) ABSTRACT

A process and apparatus which reduces the fines in a liquid discharge stream and/or increases the dryness of a solids discharge stream while under a pressure equal to or greater than the vapor pressure of the liquid. There is provided a process for separating particles such as polyethylene terephthalate or polyethylene naphthalate from a liquid in a slurry comprising feeding a slurry comprising solid particles and a liquid into a separation zone maintained at a pressure equal to or greater than the vapor pressure of the liquid; contacting the slurry in the separation zone with a porous filter; and separating liquid from the particles, wherein the liquid flows through the filter into an outer annulus defined as a space between a wall of the separation device and the filter, said porous filter having a terminal point beyond which the separated liquid does not pass from the outer annulus back through the filter; accumulating no liquid in the outer annulus or accumulating liquid in the outer annulus at a level below the terminal point, and continuously discharging the separated liquid form the outer annulus through a liquid outlet; and decoupling the particles from the separation zone through an outlet at a low pressure below the vapor pressure of the liquid at the liquid temperature within the separation zone, while maintaining a pressure on the particles prior to decoupling at or above the vapor pressure of the liquid within the separation zone.

58 Claims, 4 Drawing Sheets

U.S. PATENT DOCUMENTS

| | | | |
|---|---|---|---|
| 2,706,722 A | 4/1955 | Caldwell | |
| 3,014,011 A | 12/1961 | Zoetbrood | |
| 3,266,165 A | 8/1966 | Apostle et al. | |
| 3,390,134 A | 6/1968 | Kibler | |
| 3,458,045 A | 7/1969 | Dudley | |
| 3,495,341 A | 2/1970 | Kolb et al. | |
| 3,749,539 A | 7/1973 | Galbreath et al. | |
| 3,753,637 A | 8/1973 | Gasior et al. | |
| 3,972,852 A | 8/1976 | Inata et al. | |
| 4,123,207 A | 10/1978 | Dudley | |
| 4,251,198 A | 2/1981 | Altenburg | |
| 4,289,874 A | 9/1981 | Bockrath | |
| 4,300,877 A | 11/1981 | Andersen | |
| 4,421,470 A | 12/1983 | Nakamura | |
| 4,470,791 A | 9/1984 | Tanaka et al. | |
| 4,500,271 A | 2/1985 | Smith | |
| 4,554,303 A | 11/1985 | Petke et al. | |
| 4,591,629 A | 5/1986 | El-Ghatta et al. | |
| 4,728,275 A | 3/1988 | DiLullo et al. | |
| 4,728,276 A | 3/1988 | Pauley et al. | |
| 4,822,546 A | 4/1989 | Lohkamp | |
| 5,059,103 A | 10/1991 | Bruckmann et al. | |
| 5,164,478 A | 11/1992 | Lee et al. | |
| 5,187,216 A | 2/1993 | Cassell et al. | |
| 5,187,880 A | 2/1993 | Rudolph | |
| 5,188,856 A | 2/1993 | Hinz et al. | |
| 5,241,046 A | 8/1993 | Shiraki et al. | |
| 5,252,218 A * | 10/1993 | Muraldihara et al. | 210/636 |
| 5,280,913 A * | 1/1994 | Sirk | 273/261 |
| 5,290,913 A | 3/1994 | McAllister et al. | |
| 5,310,515 A | 5/1994 | Jurgen et al. | |
| 5,334,669 A | 8/1994 | Ghisolfi | |
| 5,393,871 A | 2/1995 | Yau et al. | |
| 5,444,144 A | 8/1995 | Tanaka et al. | |
| 5,473,826 A | 12/1995 | Kirkbir et al. | |
| 5,532,333 A | 7/1996 | Stouffer et al. | |
| 5,532,335 A | 7/1996 | Kimball et al. | |
| 5,540,868 A | 7/1996 | Stouffer et al. | |
| 5,573,820 A | 11/1996 | Harazoe et al. | |
| 5,597,586 A | 1/1997 | Wilson et al. | |
| 5,599,562 A | 2/1997 | Harris et al. | |
| 5,611,150 A | 3/1997 | Yore, Jr. | |
| 5,611,983 A | 3/1997 | Ma et al. | |
| 5,628,947 A | 5/1997 | Keilert | |
| 5,663,290 A | 9/1997 | Heise et al. | |
| 5,744,578 A | 4/1998 | Duh | |
| 5,766,533 A | 6/1998 | Mears et al. | |
| 5,785,869 A * | 7/1998 | Martinson et al. | 210/782 |
| 5,895,617 A | 4/1999 | Mizuguchi et al. | |
| 5,942,170 A | 8/1999 | Peitz | |
| 5,987,769 A * | 11/1999 | Ackerman et al. | 34/58 |
| 6,066,713 A | 5/2000 | Mrose et al. | |
| 6,068,910 A | 5/2000 | Flynn et al. | |
| 6,099,778 A | 8/2000 | Nelson et al. | |
| 6,107,445 A | 8/2000 | Paschke et al. | |
| 6,113,997 A | 9/2000 | Massey et al. | |
| 6,129,961 A | 10/2000 | Sonoda et al. | |
| 6,159,406 A | 12/2000 | Shelby et al. | |
| 6,160,085 A | 12/2000 | Fujimori et al. | |
| 6,228,302 B1 | 5/2001 | Al Ghatta | |
| 6,274,656 B1 | 8/2001 | Ma et al. | |
| 6,322,697 B1 * | 11/2001 | Hacker et al. | 210/248 |
| 6,332,765 B1 | 12/2001 | Spelleken | |
| 6,461,575 B1 | 10/2002 | Duh et al. | |
| 6,474,969 B1 | 11/2002 | Ready et al. | |
| 6,500,915 B1 | 12/2002 | Fujimori et al. | |
| 6,512,078 B1 | 1/2003 | Gantillon et al. | |
| 6,551,087 B1 | 4/2003 | Martin | |
| 6,551,643 B2 | 4/2003 | Bernatz et al. | |
| 6,551,699 B1 | 4/2003 | Flynn | |
| 6,592,350 B1 | 7/2003 | Chszaniecki | |
| 6,720,406 B1 * | 4/2004 | Elsner et al. | 528/499 |
| 6,754,979 B2 | 6/2004 | Ludwig et al. | |
| 7,192,545 B2 * | 3/2007 | Ekart et al. | 264/211.13 |
| 7,421,802 B2 * | 9/2008 | Roberts et al. | 34/312 |
| 7,470,370 B2 * | 12/2008 | Parker et al. | 210/772 |
| 2002/0171159 A1 | 11/2002 | Matthaei et al. | |
| 2003/0000100 A1 | 1/2003 | Ludwig et al. | |
| 2003/0109640 A1 | 6/2003 | Lee et al. | |
| 2004/0009254 A1 | 1/2004 | Eloo et al. | |
| 2004/0011330 A1 | 1/2004 | Sauler et al. | |
| 2005/0065318 A1 | 3/2005 | Jernigan et al. | |
| 2005/0085620 A1 | 4/2005 | Bruckmann | |
| 2005/0154183 A1 * | 7/2005 | Ekart et al. | 528/486 |
| 2006/0042113 A1 | 3/2006 | Ekart et al. | |
| 2007/0135614 A1 * | 6/2007 | Ekart et al. | 528/272 |

FOREIGN PATENT DOCUMENTS

| | | |
|---|---|---|
| CA | 2381965 | 2/2001 |
| CS | 200745 B | 6/1978 |
| DE | 1953741 | 5/1971 |
| DE | 2347013 A | 3/1975 |
| DE | 226896 | 9/1985 |
| DE | 3503330 A | 8/1986 |
| DE | 19703353 | 8/1998 |
| DE | 19848245 | 4/2000 |
| DE | 19848245 | 5/2000 |
| DE | 10149474 | 4/2003 |
| DE | 10215344 | 10/2003 |
| DE | 10333648 | 9/2004 |
| DE | 10333648 A1 | 9/2004 |
| EP | 0867458 | 9/1998 |
| EP | 0974438 A1 | 1/2000 |
| EP | 0988342 A1 | 3/2000 |
| EP | 0821640 B1 | 6/2000 |
| EP | 1181140 A1 | 2/2002 |
| EP | 0804499 B1 | 7/2002 |
| EP | 0937117 B1 | 1/2003 |
| JP | 53054295 | 5/1978 |
| JP | 56055426 A | 5/1981 |
| JP | 56118420 A | 9/1981 |
| JP | 56147823 A | 11/1981 |
| JP | 59045107 | 9/1982 |
| JP | 5925815 A | 2/1984 |
| JP | 59045106 A | 3/1984 |
| JP | 59219328 A | 12/1984 |
| JP | 60026026 A | 2/1985 |
| JP | 1180309 A | 7/1989 |
| JP | 2229560 | 9/1990 |
| JP | 96073611 | 3/1996 |
| JP | 3095166 | 6/1999 |
| JP | 2000044666 A | 2/2000 |
| JP | 3041851 | 5/2000 |
| JP | 2000143791 | 5/2000 |
| JP | 3075406 | 8/2000 |
| JP | 2001040081 | 2/2001 |
| JP | 2001072753 | 3/2001 |
| JP | 2001072754 A | 3/2001 |
| JP | 2001079836 A | 3/2001 |
| JP | 2001081171 A | 3/2001 |
| JP | 2001081174 | 3/2001 |
| JP | 2001106777 | 4/2001 |
| JP | 2001131277 | 5/2001 |
| JP | 2001247669 | 9/2001 |
| JP | 2001302777 | 10/2001 |
| JP | 2001302778 | 10/2001 |
| JP | 2003181831 | 12/2001 |
| JP | 2002105189 | 4/2002 |
| JP | 2002332340 | 11/2002 |
| JP | 2002338676 | 11/2002 |
| JP | 2003137993 | 5/2003 |
| JP | 2003200420 | 7/2003 |
| JP | 2003206346 | 7/2003 |

| | | |
|---|---|---|
| JP | 20033206344 | 7/2003 |
| JP | 2003306537 | 10/2003 |
| JP | 2003306538 | 10/2003 |
| JP | 2003306540 | 10/2003 |
| JP | 2003327680 | 11/2003 |
| JP | 2003342358 | 12/2003 |
| WO | WO 92/18554 | 10/1992 |
| WO | WO 96/22320 | 7/1996 |
| WO | WO 96/33853 | 10/1996 |
| WO | WO 97/05186 | 2/1997 |
| WO | WO 97/31968 | 9/1997 |
| WO | WO 97/42250 | 11/1997 |
| WO | WO 99/47605 | 9/1999 |
| WO | WO 00/23497 A1 | 4/2000 |
| WO | WO 00/32673 | 6/2000 |
| WO | WO 00/32677 | 6/2000 |
| WO | WO 00/46004 | 8/2000 |
| WO | WO 00/64961 | 11/2000 |
| WO | WO 01/05566 A1 | 1/2001 |
| WO | WO 01/10622 A1 | 2/2001 |
| WO | WO 01/12698 | 2/2001 |
| WO | WO 03/046046 A1 | 6/2003 |
| WO | WO 2004/033174 A1 | 4/2004 |

OTHER PUBLICATIONS

The Kreyenborg Group—Short Survey, Sales Brochure, Aug. 2004.
BKG Underwater Pelletizing Systems, Sales Brochure, Sep. 2004.
Carter Day Sales Brochure, Sep. 1, 1999 [online] [retrieved before Aug. 25, 2005] Retrieved from the Internet <URL:http://www.carterday.com/media/petrobrochure.pdf>.
BKG Bruckmann & Kreyenborg Granuliertechnik GmbH—Pelletizing Systems, 2004 Munster, Germany [online] [retrieved before Aug. 25, 2005] Retrieved from the Internet <URL:http://www.kreyenborg.com/en/bkg/>. A publication date of Jul. 19, 2003 confirmed [online] [retrieved on Nov. 18, 2008]. Retrieved from the Internet <URL:http://web.archive.bibalex.org/web/20050114064429/www.kreyenborg.com/en/bkg/produkte/master.php>. Publication date link retrieved from the Internet <URL:http:web.archive.bibalex.org/web/*hh__/kreyenborg.com>.
Centrifugal Dryer Process, Gala Industries, 2003, Eagle Rock, Virginia [retrieved before Aug. 25, 2005]. Retrieved from the Internet <URL:http://www.gala-industries.com/centridry.htm>. A publication date of Feb. 8, 2003 confirmed [online] [retrieved on Nov. 14, 2008]. Retrieved from the Internet <URL:http://web.archive.bibalex.org/web/20030605103823/www.gala-industries.com/centridry.htm>. Publication date link retrieved from the Internet <URL:http://web.archive.bibalex.org/web/*/http://gala-industries.com>.
Plastic scraps drying, Leda, [online] [retrieved before Aug. 25, 2005] Retrieved from the Internet <URL:http://www.ledarecycling.it/menu/plastic__scraps__drying.htm>. A publication date of May 24, 2004 confirmed [online] [retrieved on Dec. 2, 2008]. Retrieved from the Internet <URL:http://web.archive.bibalex.org/web/20040603040107/ledarecycling.it/menu/plastic__scraps__drying.htm>. Publication date link retrieved from the Internet <URL:http://web.archive.bibalex.org/web/*/http://www.ledarecycling.it>.
Process Description, BKG Underwater pelletizing system, Regis Machinery [online] [retrieved before Aug. 25, 2005]. Retrieved from the Internet <URL:http://www.regismachinery.co.uk/Equipment/BKG/Process__Description/process__description.html>. A publication date of Jul. 14, 2003 confirmed [online] [retrieved on Dec. 2, 2008]. Retrieved from the Internet <URL:http://web.archive.bibalex.org/web/20030715200841/regismachinery.co.uk/Equipment/BKG/Process__Description/process__description.html>. Publication date link retrieved from the Internet.
Process Dryers Specifications, GlobalSpec, Troy, New York [online] [retrieved before Aug. 25, 2008] Retrieved from the Internet <URL:http://process-equipment.globalspec.com/Specifications/Processing__Equipment/Heat__Transfer__Equipment/Process__Dryers>. A publication date as early as Aug. 8, 2003 confirmed [online] [retrieved on Dec. 2, 2008] Retrieved from the Internet <URL:http://web.archive.bibalex.org/web/20040625110450/process-equipment.globalspec.com/Specifications/Processing__Equipment/.
USPTO Office Action dated Sep. 8, 2008, in copending U.S. Appl. No. 11/134,946.
USPTO Office Action dated Feb. 10, 2009, in copending U.S. Appl. No. 11/134,946.
Notice of Allowance dated Aug. 17, 2009, in copending U.S. Appl. No. 11/134,946.
U.S. Appl. No. 11/134,946, filed May 23, 2005.
USPTO Office Action dated Jan. 14, 2010 in U.S. Appl. No. 11/134,946.
International Search Report and Written Opinion of the International Searching Authority for Corresponding PCT Application PCT/US2006/030688 dated Sep. 15, 2008.
Carter Day Sales Brochure, Sep. 1, 1999 [online] [retrieved before Aug. 25, 2005] Retrieved from the Internet <URL:http://www.carterday.com/media/petrobrochure.pdf>.
Broadbent—Industrial Process—Purge panels, Broadbent, United Kingdom 2002, [online] [retrieved before Aug. 25, 2005] Retrieved from the Internet <URL:http://www.broadbent.co.uk/site__02/html/industrial/purge__panels.html>. Applicant points out that the year of the publication is sufficiently earlier than the effective filing date of Sep. 2, 2004, so that the particular month of publication is not in issue. MPEP §609.04(a).
CDL Pelletizers, 2004 CDL Technology, Inc., Addison, Illinois [online] [retrieved before Aug. 25, 2005] Retrieved from the Internet <URL:http://www.cdli.com/waterring.html>. Applicants cannot find date of publication including the month.
Office Action dated Jul. 21, 2010 in copending U.S. Appl. No. 11/134,946.

* cited by examiner

US 7,875,184 B2

CRYSTALLIZED PELLET/LIQUID SEPARATOR

CROSS REFERENCE TO RELATED APPLICATION

This application claims priority to U.S. Provisional Application Ser. No. 60/719,533 filed on Sep. 22, 2005.

1. FIELD OF THE INVENTION

The invention pertains to an apparatus and a process for separating a pressurized slurry of solids and liquid, and more particularly to separating polymeric polymer particles from a hot liquid in a separation device while maintaining the pressure on the solids in the separation device at or above the vapor pressure of the liquid to reduce fines in the liquid or produce a dryer solid or both.

2. BACKGROUND OF THE INVENTION

In previously filed patent applications U.S. Ser. Nos. 10/986,129 and 10/683,522 and 10/665,664, polyester particles are crystallized in a liquid at a temperature above the $T_g$ of the liquid. In many instances, the liquid vapor pressure exceeds atmospheric at such temperature, thereby requiring the application of pressure to retain the fluid in a liquid state. Upon reaching a desired degree of crystallization, the partially crystallized particles are separated from the liquid in a separation device comprising a cylindrical wire mesh into which the particles accumulated into a particle bed, with the liquid flowing into the outer annulus and discharged through a liquid outlet. The liquid outlet discharges the liquid and fines, which is then recycled back directly or indirectly to the polyester polymer underfluid cutter. Without providing a further separation technique for removing fines, the fines would eventually build up in the closed loop process and foul equipment.

The particles are discharged through a gate means which maintains the pressure within the separation device above the vapor pressure of the liquid at the liquid temperature. Illustrated as a gate means is a rotary air lock valve.

In the configuration described in one or more of the above US Patent Applications, the particle bed approaching the rotary air lock valve is submerged in water, and in one embodiment, a jet of cool water is injected into the particle bed near the rotary air lock. As a result, the particles discharged from the separation device have a water content proportional to the amount of water entrained in the gate means. The discharged particles could be sent to dryers.

It would be desirable to provide a low cost separation device which provides a solids discharge stream with lower water content. Alternatively, it would be desirable to reduce the fines content in the liquid discharge outlet.

3. SUMMARY OF THE INVENTION

There is now provided a process and apparatus which reduces the fines in a liquid discharge stream and/or increases the dryness of a solids discharge stream while under a pressure equal to or greater than the vapor pressure of the liquid under a pressure equal to or greater than the vapor pressure of the liquid. In a first embodiment, there is provided a separation device comprising:

a. an inlet for continuously receiving a feed of slurry;
b. a cross-flow filter, having pores, disposed within the separation device to form an outer annulus defined as a space between the wall of the separation device and the cross-flow filter to receive liquid, the inlet and the cross-flow filter oriented such that the particles entering the separation device through the inlet flow tangentially to the pore openings of at least a portion of the cross-flow filter, said cross-flow filter having a pore size which is smaller than the number average solid particle size in its smallest dimension,
c. a liquid outlet located on the separation device for discharging at least a portion of said liquid from the outer annulus;
d. a solids outlet for discharging the solid particles, and
e. a decoupling device through which the particles are discharged synchronous to the motion of the gate, and said decoupling device providing a seal to maintain a pressurized environment within the separation device above the vapor pressure of the liquid.

In a second embodiment, there is provided a process for separating particles from a liquid comprising:

a. feeding a slurry, comprising solid particles and a liquid, at a liquid temperature at or above the normal boiling point of the liquid and under a pressure of greater than the vapor pressure of said liquid through the inlet of a separation device into a separation zone maintained at a pressure greater than the vapor pressure of the liquid;
b. contacting the slurry against a cross flow filter in the separation zone to separate the liquid from the solid particles moving in a direction tangential to the flow of liquid across the filter, wherein the liquid flows into an outer annulus defined as a space between the wall of the separation device and the filter, said cross-flow filter having a pore size which is smaller than the number average solid particle size in its smallest dimension;
c. discharging the separated liquid from the outer annulus through a liquid outlet;
d. discharging the separated solid particles from the separation device while maintaining a pressurized environment within the separation zone.

There is now also provided an apparatus and a process which reduces the water content of a solid discharge stream without the necessity for adding rotation means or applying heat. In a third embodiment, the separation device comprises:

a. an inlet for continuously receiving a feed of slurry comprising solid particles and a liquid;
b. a porous filter disposed within the separation device to form an outer annulus receiving the liquid, the outer annulus defined as a space between the wall of the separation device and the filter, said porous filter terminating at a terminal point;
c. a liquid outlet located on the separation device for discharging at least a portion of said liquid from the outer annulus, wherein the terminal point is located above or in front of the liquid outlet;
d. a solids outlet for discharging the solid particles in direct or indirect contact with the filter, and
e. a decoupling device sealed to the solids outlet through which the particles are discharged and under which a pressurized environment within the separation device is maintained at or above the vapor pressure of the liquid.

In a fourth embodiment, there is provided a process for separating particles from a liquid in a slurry comprising:

a. feeding a slurry comprising solid particles and a liquid into a within a separation zone maintained at a pressure equal to or greater than the vapor pressure of the liquid;
b. contacting the slurry in the separation zone with a porous filter and separating liquid from the particles, wherein the liquid flows through the filter into an outer annulus defined as a space between the wall of the separation device and the filter, and said porous filter having a terminal point beyond which the separated liquid does not pass from the outer annulus back through the filter;

c. accumulating no liquid in the outer annulus or accumulating liquid in the outer annulus at a level below or in front of the terminal point, and continuously discharging the separated liquid from the outer annulus through a liquid outlet;

d. decoupling the particles from the separation zone through the solids outlet to a low pressure below the vapor pressure of the liquid at the liquid temperature within the separation zone while maintaining a pressure on the particles prior to decoupling at or above the vapor pressure of the liquid within the separation zone.

4. BRIEF DESCRIPTION OF THE DRAWING

5. DETAILED DESCRIPTION OF THE INVENTION

Figure 1:
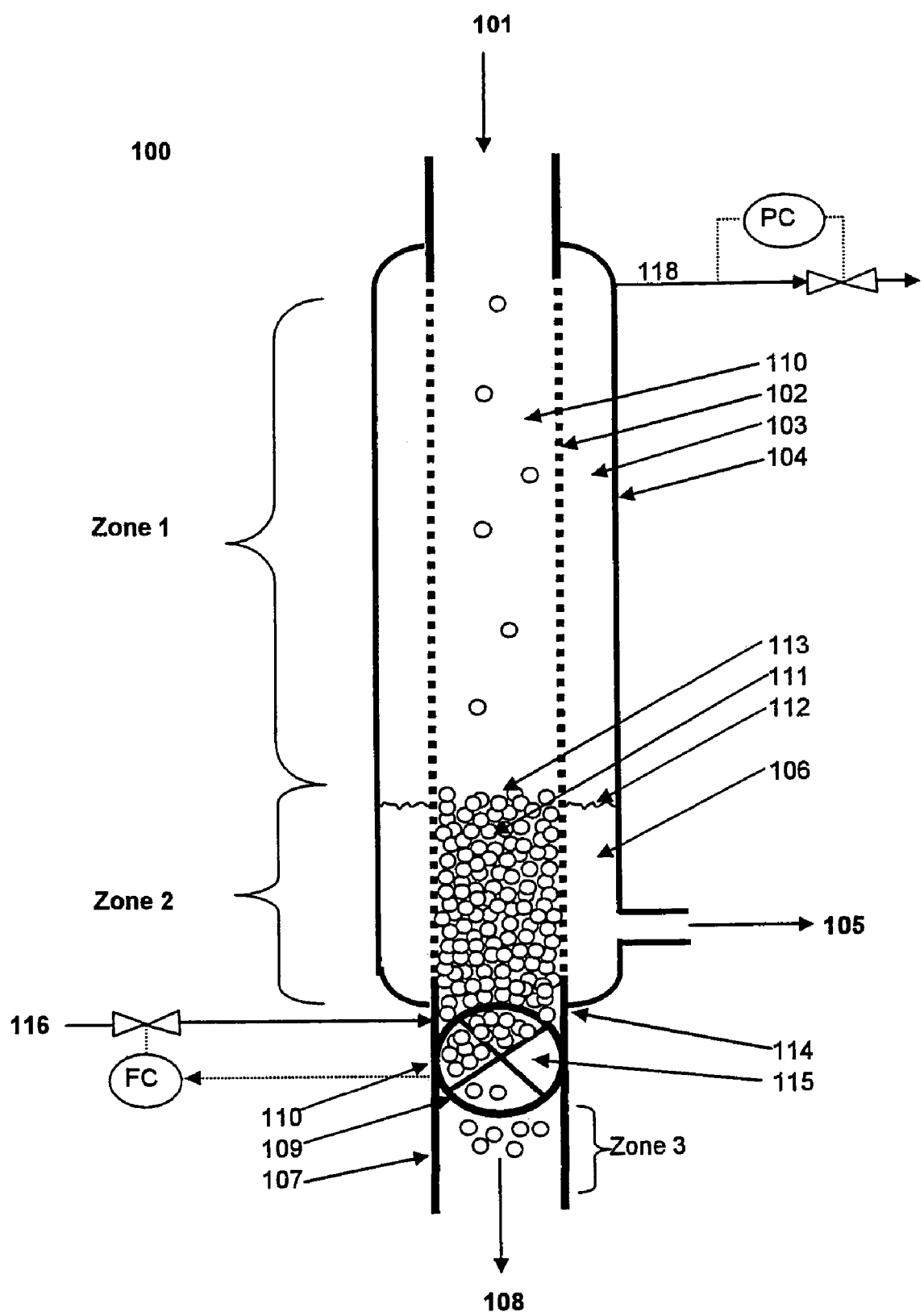
FIG. 1 illustrates a cross-flow separation device.

The present invention may be understood more readily by reference to the following detailed description of the invention, including the appended figures referred to herein, and the examples provided therein. It is to be understood that this invention is not limited to the specific processes and conditions described, as specific processes and/or process conditions for processing plastic articles as such may, of course, vary.

It must also be noted that, as used in the specification and the appended claims, the singular forms "a," "an" and "the" include plural referents unless the context clearly dictates otherwise. For example, reference to processing a thermoplastic "preform", "article", "container", or "bottle" is intended to include the processing of a plurality of thermoplastic preforms, articles, containers or bottles. References to a composition containing "an" ingredient or "a" polymer is intended to include other ingredients or other polymers, respectively, in addition to the one named.

Ranges may be expressed herein as from "about" or "approximately" one particular value and/or to "about" or "approximately" another particular value. When such a range is expressed, another embodiment includes from the one particular value and/or to the other particular value.

By "comprising" or "containing" is meant that at least the named compound, element, particle, or method step etc must be present in the composition or article or method, but does not exclude the presence of other compounds, materials, particles, method steps, etc, even if the other such compounds, material, particles, method steps etc. have the same function as what is named.

It is also to be understood that the mention of one or more method steps does not preclude the presence of additional method steps or intervening method steps between those steps expressly identified.

The intrinsic viscosity values described throughout this description are set forth in dL/g units as calculated from the inherent viscosity measured at 25° C. in 60/40 wt/wt phenol/tetrachloroethane.

A slurry of solid particles is fed to the separation device.

The shape of the particles is not limited, and is typified by regular or irregular shaped discrete particles without limitation on their dimensions, including flake, stars, spheres, cylindrical, ellipsoid, conventional pellets, chopped fibers, and any other shape such as the shape of a particle formed by cutting blades. Particles may, however, be distinguished from a sheet, film or continuous fiber.

The size of the particles is larger than the pore size of the cross-flow filter. In one embodiment, the number average particle size in the slurry is at least 0.1 mm, or at least 0.5 mm, or at least 1 mm, or even at least 2 mm in their smallest dimension. The particles generally will not have a number average particle size any greater than 24 mm, or not any greater than 15 mm, or not greater than 10 mm in their smallest dimension. The longest axis of the particles is on average at least 1 mm.

In one embodiment, the particles are in the shape of a pellet. The pellet can have a wide variety of aspect ratios, but generally has an aspect ratio of about 0.25 to about 3.0.

The % solids in the slurry feed by volume can vary widely. In general, the volume % solids in the slurry feed to the separation device range from 2 vol. % to 90 vol. %, or 5 vol. % to 60 vol. %.

The slurry has a continuous phase of liquid and a discontinuous phase of solid polymer particles. The polymer particles are not soluble in the continuous phase under separation conditions. The continuous liquid phase is preferably water in an amount of at least 50 wt. % based on the weight of the liquid, more preferably at least 80 wt. %, more preferably at least 95 wt. %, although other liquid carriers are also suitable such as diols and diluents. The particles are solid under the operating conditions. A solid particle is one which is sufficiently solid to form a discrete phase with the liquid as the continuous phase, or in the event that insufficient liquid is provided to form a continuous phase, then sufficiently solid to prevent the particles from sticking to each other, agglomerating, and thereby plugging the piping or inlets to the separation device. Thus, the particles may be above their $T_g$ and yet be deemed solid so long as their melting temperature has not been exceeded.

The particles fed to the separation device can be inorganic or organic solid particles. Preferably, the particles are organic, and more preferably are polymers. The polymer particles can be thermoplastic polymer particles or thermosetting polymer particles. Since the polymers are in the form of particles, the polymers are preferably thermoplastic so that they can be heated, melted, formed into the desired shape, and solidified upon recooling without undergoing appreciable chemical change or crosslinking. A thermoplastic polymer is also distinguishable from liquid crystal polymers in that thermoplastic polymers have no ordered structure while in the liquid (melt) phase. However, in the event that one desires to retain the particle shape of a polymer for a particular application, then thermosetting polymers are useful.

Examples of thermoplastic polymers include thermoplastic elastomers including polyurethane elastomers, polyolefins such as poly(ethylene), poly(propylene), poly(butadiene), poly(isoprene), and their comonomers; the acrylate copolymers, polyvinyl chloride, styrene and styrene copolymers and the vinylbenzene based polymers and copolymers, acrylonitrile butadiene styrene, polyamides, polycarbonate, ethylvinyl acetate, and polyesters. Exemplary thermoplastic polymers include polyamides, polycarbonates, polyesters, and polystyrene polymers and copolymers.

In one embodiment, there is provided polyester polymer particles. Desirably, the "polyester polymer" contains alkylene terephthalate units or alkylene naphthalate units in an amount of at least 60 mole % based on the total moles of units in the polymer, respectively. The polyester polymer may optionally be isolated as such. The It.V. of the polyester polymers typically range from 0.55 dL/g to 1.1 dL/g. Therefore, in order to avoid a solid stating step, a preferred It.V. of non-solid state polymerized particles is at least 0.7 dL/g, or 0.75 dL/g, and up to about 1.2 dL/g, or 1.15 dL/g. This It.V. can be measured on amorphous particles from a melt phase manufacture, or on partially crystallized particles.

The particles are dispersed in a liquid. The type of liquid chosen is not limited so long as remains a liquid at the selected operating temperature and pressure and does not dissolve the particles. For example, the liquid should not substantially depolymerize the polymer particles under the operating conditions.

In a preferred embodiment, it is desired to use liquids which have a high heat capacity to optimize heat transfer to the pellets at the lowest possible residence time. Liquids which have low vapor pressures are also desirable to further reduce equipment costs since a system with a lower pressure rating can be used. However, a significant and sometimes overriding factor to consider in the selection of the liquid is the ease with which the liquid is separated from the particles, the ease with which the liquid is volatized from the inside of the particles if pertinent, and the costs associated with handling, heating and recirculating the separated liquid back to the separation device or its disposal.

Examples of suitable fluids include water; alcohols; a variety of glycols including ethylene glycol, diethylene glycol, triethylene glycol, propylene glycol, dipropylene glycol; polyalkylene glycols (e.g. PEGs), or combinations thereof. For many applications, the liquid will be water. Water is inert to most particles and it has a suitable heat capacity. The heat capacity of water, 1 cal/g/° C., is attractive and the ease with which water is separated from the particles and later volatized from the particles if completely dried is excellent. The vapor pressure of water is about 24 torr at room temperature, 760 torr at 100° C., 2706 torr at 140° C., and 7505 torr at 180° C.

While it is desirable to use liquids which have a high heat capacity to optimize heat transfer to the pellets at the lowest possible residence time, and to reduce equipment costs by using a lower pressure rated vessel, a significant and sometimes overriding factor in the selection of the liquid is the ease with which the liquid is separated from the pellets, the ease with which the liquid is volatized from the inside of the pellet, and the costs associated with handling, heating and recirculating the separated liquid back to into the loop for entraining the particles with the liquid.

The liquid temperature in the slurry is not particularly limited. In the first and second embodiment, and optionally in the third and fourth embodiment, the liquid temperature is at or exceeds the normal boiling point of the liquid at 1 atm. The process and apparatus of the invention is particularly suited to process a slurry stream under a pressure exceeding 1 atmosphere. The particular operating temperature will depend on the nature of the liquid chosen, the temperature of the process which produces the slurry, and the desired effect on the particles, if any. For example, since the vapor pressure of water is 1 atmosphere at 100° C., the slurry temperature as measured by the temperature of the liquid medium exceeds 100° C., thereby requiring the application of greater than 1 atmosphere of pressure to keep the water in liquid state. Generally, the temperature of the slurry (as measured on the liquid) exceeds 50° C., or exceeds 75° C., or exceeds 100° C., or exceeds 125° C., and generally does not exceed 300° C., and in many cases does not exceed 200° C.

The slurry is fed to the separation device under a pressure equal to or greater than the vapor pressure of the liquid. The particular pressure chosen depends on the nature of the liquid medium and the application requirements. The pressure is preferably greater than 1 atmosphere (760 torr, 14.7 psia), or 50 psia or more, or 75 psia or more, or 100 psia or more, or 150 psia or more, or 200 psia or more. In general, the pressure on the slurry does not need to exceed 500 psia, or 300 psia using water as the liquid medium.

In one embodiment, the feed of slurry to the separation device comprises partially crystallized polyester polymer particles in water at a water temperature above 100° C., or above 120° C. The polymer particles are crystallized to a degree of crystallinity of at least 20%, or at least 30%, or at least 35%, or at least 40%. More preferably, the particles are obtained by cutting the polyester polymer melt underwater and feeding the resulting slurry directly or indirectly to the separation device.

In one embodiment the separation device comprises:
  a. an inlet for continuously receiving a feed of slurry;
  b. a cross-flow filter, having pores, disposed within the separation device to form an outer annulus defined as a space between the wall of the separation device and the cross-flow filter to receive liquid, the inlet and the cross-flow filter oriented such that the particles entering the separation device through the inlet flow tangentially to the pore openings of at least a portion of the cross-flow filter, said cross-flow filter having a pore size which is smaller than the number average solid particle size in its smallest dimension,
  c. a liquid outlet located on the separation device for discharging at least a portion of said liquid from the outer annulus;
  d. a solids outlet for discharging the solid particles, and
  e. a decoupling device through which the particles are discharged synchronous to the motion of the gate, and said decoupling device providing a seal to maintain a pressurized environment within the separation device above the vapor pressure of the liquid.

In a second embodiment, there is provided a process for separating particles from a liquid comprising:
  a. feeding a slurry, comprising solid particles and a liquid, at a liquid temperature at or above the normal boiling point of the liquid and under a pressure of greater than the vapor pressure of said liquid through the inlet of a separation device into a separation zone maintained at a pressure greater than the vapor pressure of the liquid;
  b. contacting the slurry against a cross flow filter in the separation zone to separate the liquid from the solid particles moving in a direction tangential to the flow of liquid across the filter, wherein the liquid flows into an outer annulus defined as a space between the wall of the separation device and the filter, said cross-flow filter having a pore size which is smaller than the number average solid particle size in its smallest dimension;
  c. discharging the separated liquid from the outer annulus through a liquid outlet;
  d. discharging the separated solid particles from the separation device while maintaining a pressurized environment within the separation zone.

In a third embodiment, the separation device comprises:
  a. an inlet for continuously receiving a feed of slurry comprising solid particles and a liquid;
  b. a porous filter disposed within the separation device to form an outer annulus receiving the liquid, the outer annulus defined as a space between the wall of the separation device and the filter, said porous filter terminating at a terminal point;
  c. a liquid outlet located on the separation device for discharging at least a portion of said liquid from the outer annulus, wherein the terminal point is located above or in front of the liquid outlet;

d. a solids outlet for discharging the solid particles in direct or indirect contact with the filter, and e. a decoupling device sealed to the solids outlet through which the particles are discharged and under which a pressurized environment within the separation device is maintained at or above the vapor pressure of the liquid.

In a fourth embodiment, there is provided a process for separating particles from a liquid in a slurry comprising:

a. feeding a slurry comprising solid particles and a liquid into a within a separation zone maintained at a pressure equal to or greater than the vapor pressure of the liquid;

b. contacting the slurry in the separation zone with a porous filter and separating liquid from the particles, wherein the liquid flows through the filter into an outer annulus defined as a space between the wall of the separation device and the filter, and said porous filter having a terminal point beyond which the separated liquid does not pass from the outer annulus back through the filter;

c. accumulating no liquid in the outer annulus or accumulating liquid in the outer annulus at a level below or in front of the terminal point, and continuously discharging the separated liquid from the outer annulus through a liquid outlet;

d. discharging the separated solid particles from the separation. device through a decoupling device sealed to the separation zone to maintain a pressurized environment within the separation zone.

The slurry is fed continuously into the separation device. To maintain a relatively constant packed bed height as described below, and to avoid systemic significant pressure fluctuations, the slurry feed is maintained at a constant rate. There is no particular limit to the flow rate or pellet velocity through the inlet of the separation device other than the self imposed limits on the desired rate for discharging the liquid and solids from the separation device and the desired vessel sizing.

In the first and second embodiments, the separation device is equipped with a cross-flow filter disposed within the separation device in a manner to form an outer annulus defined as a space between the wall of the separation device and the cross-flow filter. The geometry of the filter is not limited. The shape of the outer annulus is not particularly limited and will depend on the geometry of the cross-flow filter as inserted into the separation device. For example, if the cross flow filter lies on a flat plane, the shape of the outer annulus will be in the form of a cylinder cut along its longest dimension by the flat plane of the cross flow filter. If the shape of the cross-flow filter is shaped as a cylinder disposed within the separation device, the outer annulus will also be shaped as an outer cylinder surrounding the cross-flow filter.

The cross-flow filter is a filter in which the particles in a feed stream flow tangential to flow of the liquid through the filter media. A portion of the continuous phase passes through the filter media, collects in the filter shell, and exits as a liquid phase. The solids as well as the balance of the continuous phase exits as a solids continuous discharge. By contrast, dead end filters build a cake. Cross-flow filtration commonly utilizes thin film polymeric membrane filter media, ceramic filter media, hollow fiber media, or sintered metal filter media to enable the concentration of fine particles (<1 micron) in a continuous liquid phase. These filters may be classified as microfilters, nanofilters, ultrafilters, and reverse osmosis filters.

To prevent the average particle from flowing through the filter into the outer annulus and being discharged along with the liquid, the cross-flow filter has a pore size which is smaller than the number average particle size in its smallest dimension. The pore size is measured against the smallest dimension of the average particle size because as the particles closely pack, they should not be displaced from the packing into the outer annulus by the internal pressure of the separation device. For example, it would not be desirable to size the pores of the cross-flow filter against the largest dimension of a needle-like particle since the needle, at the proper orientation, can easily flow through such large pores. The pore size of the cross filter is desirably sufficiently small to prevent transmission of at least 98 volume % of the particles through the cross filter. More preferably, the average pore size of the cross flow filter is 1 micron or less.

The cross-flow filter should be sealed against the inlet to the separation device to prevent particles from crossing over into the outer annulus. The cross-flow filter may be attached to the inlet directly or indirectly through any means, such as a pipe protruding into the separation device from the inlet and attached at its other end to the cross-flow filter.

Figure 4:
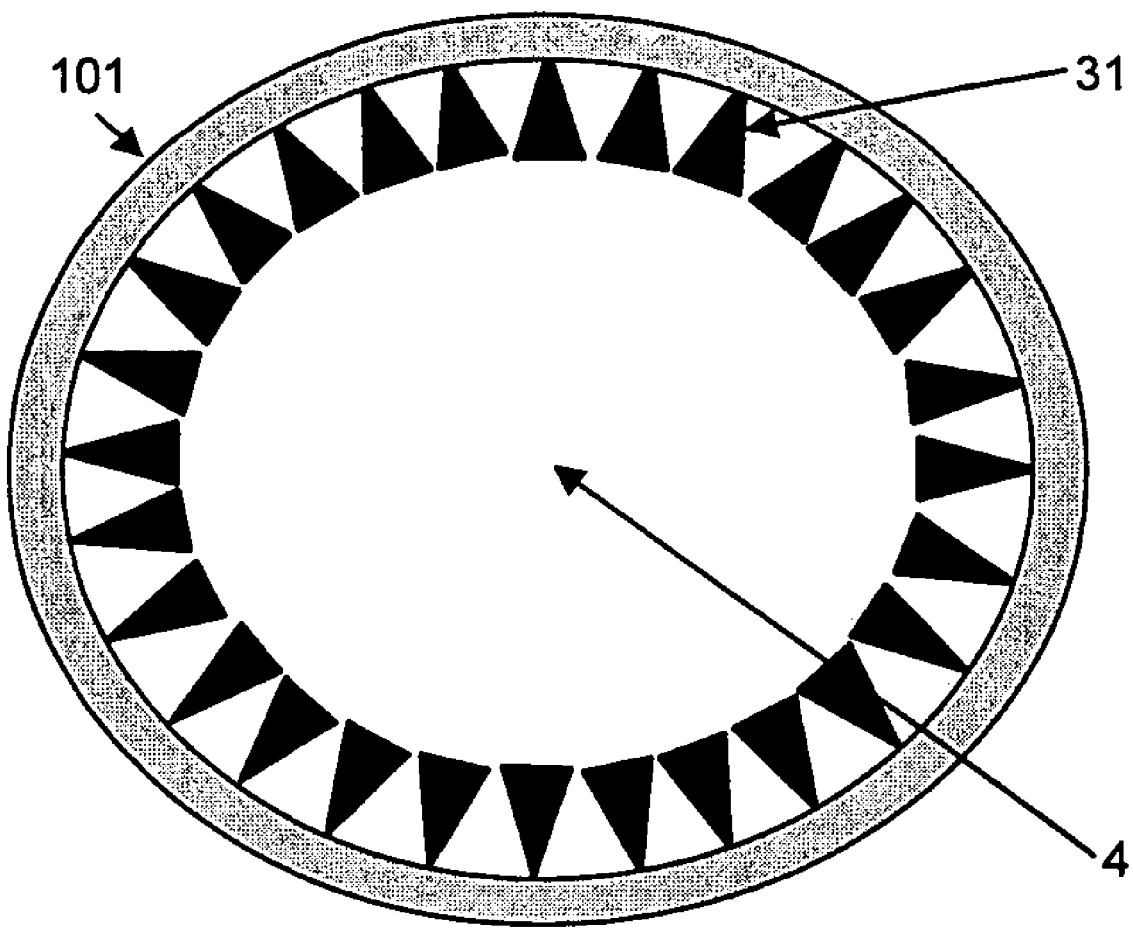
FIG. 4 is a cross-sectional view of a v-wedge cross flow filter.

In a third and fourth embodiments, any filter media which allows the passage of liquid but not the average particle size is suitable. As an illustration only, a filter media 101 is configured with V wedges. A cross sectional view of a V wedge wire porous cylinder is illustrated in FIG. 4. The orientation of the V wedge wires making up the porous cylinder is not limited but the preferred orientation is that the V wedge wires run parallel to the long axis of the filter (coming out of the page) with a flat side 31 of the wire turned to the interior of the porous cylinder forming the inner annulus 4. While the height of the porous cylinder and cross sectional area within the porous cylinder are not limited by the dynamics of dewatering and formation of a close pack of polymer particles, these dimensions do determine a suitable range of the packed bed volume and therefore influence the particle residence time within the porous cylinder.

FIG. 1 illustrates a cross-flow separation device. For convenience sake, the liquid medium continuous phase will be referred to as water, although it is to be understood that any liquid medium forming a continuous phase is suitable as described above. In this depiction, the separation device is oriented substantially vertical, but is not limited to a vertical orientation. Further, the cross flow filter 102 is cylindrical and oriented with its longest axis substantially parallel to the longest axis of the separation device 100. If desired, the separation device 100 may also be oriented horizontally, or on any plane between the horizontal and the vertical. In FIG. 1, the inlet 101 is depicted at the top or at one end of the separation device. If desired, the inlet can be positioned as a side entry feed. With a top entry feed, the flow of solid particles is tangential and even substantially perpendicular to the path of water flowing through the cross-flow filter, and the particle path is also substantially parallel to the surface of the cross-flow filter.

The slurry is continuously fed through the inlet 101 of the separation device 100 and into the inner annulus 110 of the cross-flow filter 102. Just as the geometry of the outer annulus 103 is not limited, the geometry of the inner annulus 110 is also not particularly limited, so long as it retains the particles until they are discharged and keeps the particles separated from the outer annulus 103. In the case of using a cylindrical cross flow filter media, the slurry flows through the inlet 101, into the inner annulus 110 of the cylindrical filter media 102, and toward the solid discharge outlet 107 of the separation device. The slurry fed through inlet 1 is pressurized at or above the vapor pressure of water or other liquid used. If the separation device is oriented vertically with respect to the plane of the earth, the slurry free falls for a certain distance through the inner annulus 110 of the cross flow filter media toward the bottom of the separation device, and as it free falls, the particles tangentially impinge the cross flow filter media at least for some distance. The flow of the particles against the filter media is tangential rather than parallel, through at least a portion of the cross flow filter media. In general, the particle flow vector is at an angle of greater than 10°, or greater than 35°, or greater than 45° to the flow vector of water through the filter. The force of impingement through free fall and the inlet velocity of the slurry force the liquid through the pores of the filter. This zone, where the slurry free falls coupled with its inlet velocity is Zone 1.

Figure 2:
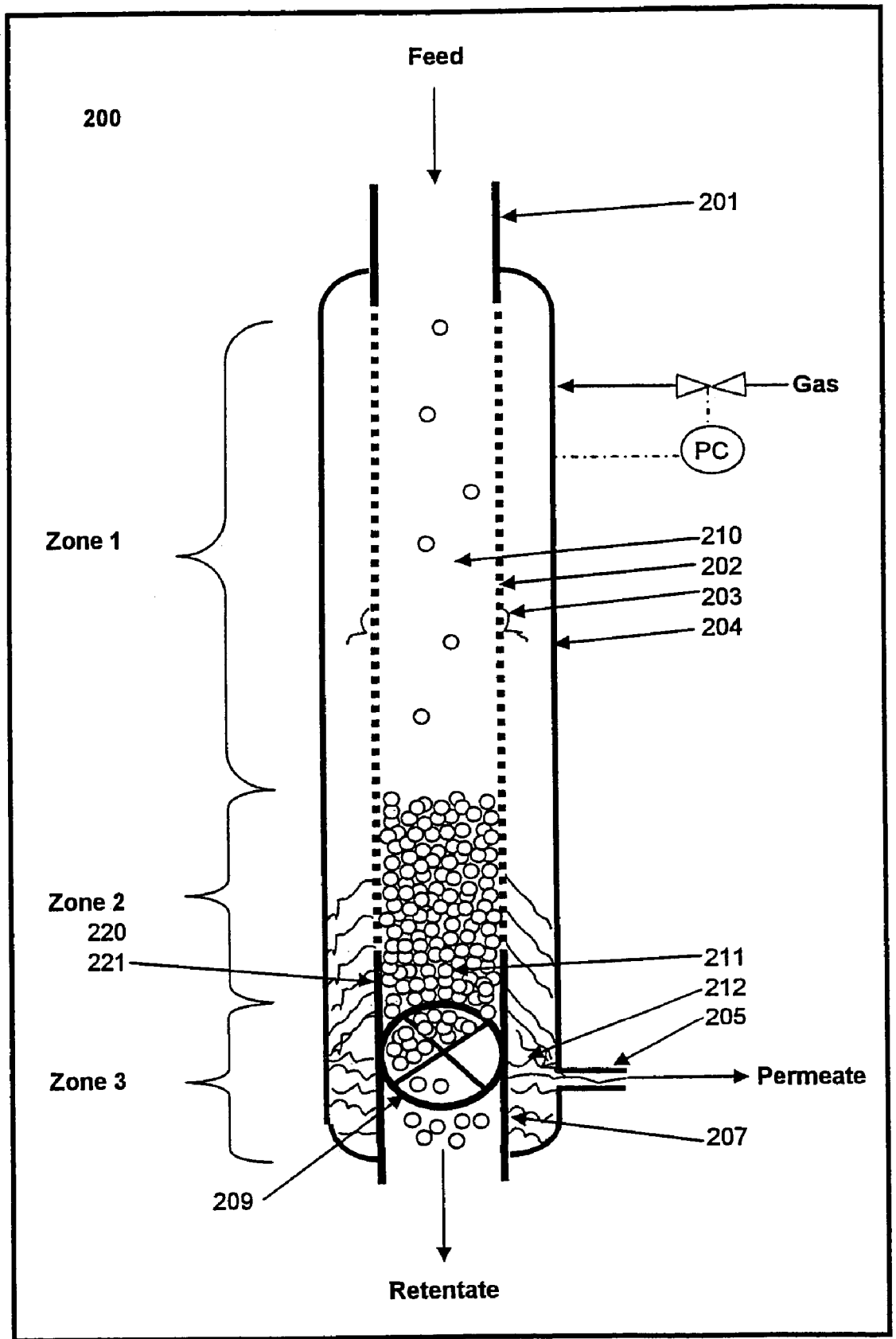
FIG. 2 illustrates a separation device having a terminal imaginary plane above the water line such that water cannot enter the particle bed.
Figure 3:
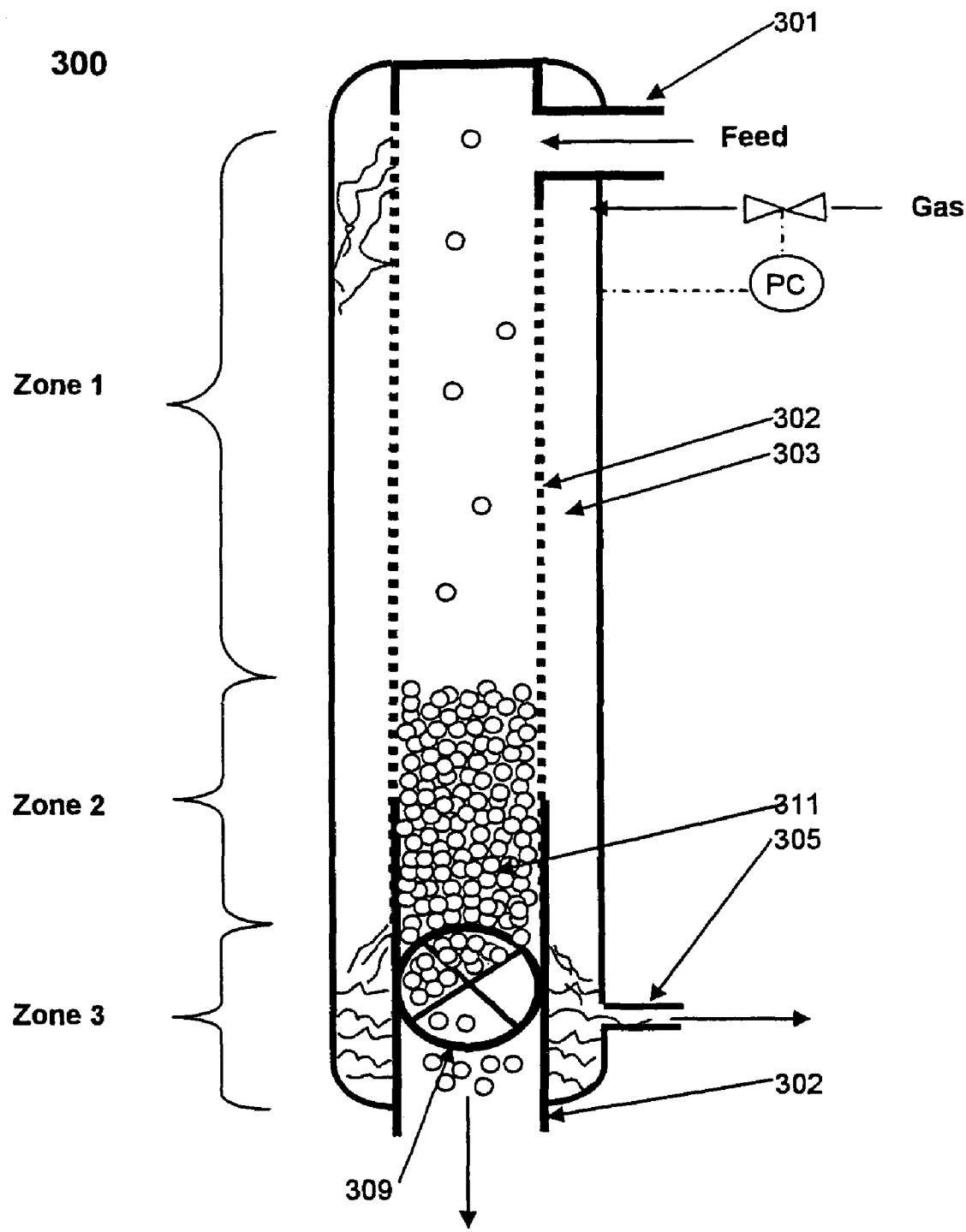
FIG. 3 illustrates a separation device in which the feed is a side feed.

The cross-flow filter 102 will operate in any physical orientation, but it is preferred that the filter 102 be installed such that its longest axis is parallel to the longest axis of the separation device 100, and in this case, the filter 102 is installed in a vertical orientation with the feed entering at the top. In FIG. 1, 2, and 3 the cross flow filter design is cylindrical, thereby forming a circumferential outer annulus 103, or a jacket. The space within the cylindrical cross-flow filter 102 forms an inner annulus 110 through which the slurry fed through the inlet 101 falls.

The bed of packed particles is Zone 2. This zone begins where the slurried particles come to a rest from their free fall and ends where the particles in the packed bed are discharged from the high pressure environment into a lower pressure environment. Once the particles rest on the packed bed 111, the water continues to flow through the cross-flow filter into the outer annulus 103. At this stage, the flow rate of particles is substantially reduced but nevertheless is tangential to the flow of liquid displaced within the bed through the filter. The majority of the water is displaced from the particles as the slurry closely approaches the packed bed 111 and as it comes to a rest on the packed bed itself 111. The density gradient of the particles within the slurry increases as more water is displaced while the slurry travels further toward the discharge outlet 110, thereby displacing more of the water remaining in the void spaces.

In the upper Zone 1, particles in the slurry are relatively dilute and fall through the inner annulus 110 at a rate influenced by their inlet velocity and the acceleration of gravity as calculated by the Stokes relationship. In this zone, some water is displaced from the slurry through the cross-flow filter into the outer annulus. The greater portion of water is displaced in the lower Zone 2, where the particles closely pack, and the void volume is decreased, resulting in the large displacement of water through the cross-flow filter 102 into the outer annulus 103.

It is desirable to maintain the particle bed height at a constant value in order to maintain a constant particle residence time within the separation device. However, the height of the particle bed can range from 1% to 99% of the total height of the separation zone, which is the zone in which the pressure is at or above the vapor pressure of the liquid and commences at the inlet of the separation device. A preferred particle bed height ranges from 30% to 60% of the separation zone height.

The liquid separated into the outer annulus 103 desirably contains only separated liquid and fines, if any. The presence of particles in the permeate indicates a tear in the cross-flow filter, improperly sizing the pore size relative to the feed particles, or a seal breach. The solids stream contains solids and any remaining portion of the liquid from the slurry feed. Preferably, at least 80 vol % of the liquid, more preferably at least 90 vol %, and most preferably at least 95 vol. % of the liquid fed to the separation device is discharged in the liquid outlet stream through the liquid discharge 105.

The liquid 106 in the outer annulus 103 is discharged from the separation device through a liquid discharge outlet 105 on the wall of the separation device. One or more liquid discharge outlets 105 may be provided. There are a variety of suitable liquid discharge outlet locations. The precise location will depend on whether the separation device is flooded with liquid, or is only partially filled with liquid, or whether any liquid is retained. In one embodiment, at least 90% of the outer annulus 103 volume is filled with liquid. In another embodiment, less than 20% of the outer annulus volume is filled with liquid.

The liquid outlet discharge is located below the liquid level line 112. It is preferred to allow only a partial volume of liquid to pool toward the bottom end of the separation device, or to allow no liquid to pool, because a greater amount of the liquid from the void volume of the close packed particle bed in Zone 2 can be displaced from the particle bed and exit through the cross flow filter into the outer annulus. By contrast, a separation device completely filled with water to some extent equilibrates the volume of water across the outer annulus in Zone 1 and Zone 2. While the net flow of liquid is away from the packed bed and through the permeate discharge, the flow rate is enhanced if no back pressure is exerted against the liquid in the void volume of the packed bed. Most preferred is process in which the outer annulus is partially filled with liquid, and more preferred that the outer annulus is filled with liquid to a level 112 below the top of the solid particle bed 113, and most preferred is an outer annulus having a liquid level below the terminal point of the filter. The flow rate of the slurry into the separation device and the flow of the liquid and solids through the liquid discharge outlet and the solids discharge outlet is adjusted to provide a pool of accumulated liquid (hold up liquid) in the outer annulus at a level below the top of the particle bed, or to provide for a liquid level below the terminal point of the filter, or to provide for no hold up liquid in the outer annulus.

A portion or all of the liquid discharged from the separation vessel can be recycled back to the liquid feed system for creating the slurry of particles and water directly or indirectly through one or more pumps, filters for taking out fines, condensers for cooling the liquid, or heat exchangers for heating the permeate, or a combination of the foregoing. Depending on the particulars of the process used, other refinement or purification steps can be applied, or the liquid can be used to save energy by heating or cooling other lines or vessels in the same plant or in co-located plants.

The solids discharge stream 108 comprises solid particles and a portion of liquid not displaced or flowing through the cross-flow filter into the outer annulus ("remaining liquid"). The solids discharge stream may also contain fines which did not escape through the cross-flow filter, if any. The solids discharge stream is discharged from the separation device through the solids outlet 107. The decoupling point within the solids outlet 107 is the point at which the solids discharge stream passes from a high pressure environment to a low pressure environment below the vapor pressure of the liquid inside the separation zone while retaining a pressure within the separation device at or above the vapor pressure of the liquid.

In the first and second embodiment, the solids outlet contains a decoupling device 109 which is the mechanism by which the solids are discharged from a high to lower pressure environment. The decoupling device is sealed directly or indirectly to the walls of the solids outlet to prevent pressure leaks across the decoupling device-solids outlet junction 110. The decoupling device can be sealed to the inner or outer walls of the solids outlet.

The solids outlet 107 may comprise solely one decoupling device, or more than one decoupling device. The discharge outlet pressure profile does not have to comprise one step wise pressure let down over distance, but may comprise a series of pressure let down steps, or it may be a continuous pressure let down while maintaining a pressurized environment within the separation device at or above the vapor pressure of the liquid to avoid flashing the liquid inside the vessel. The pressure drop within the separation device between the inlet 101 and the decoupling device 109 is preferably less than 10%, more preferably less than 5%.

In the process of the invention, the particles are decoupled from the separation zone by depressurizing the particles to a low pressure below the vapor pressure of the liquid at the liquid temperature while maintaining a high pressure on the particles prior to depressurization at above the vapor pressure of the liquid at the liquid temperature. It is expected that some pressure loss will occur in the separation zone due to the decoupling mechanisms which do not perfectly maintain the same pressure on either side of the mechanism. The pressure inside the separation zone should not drop and stay below the vapor pressure of the liquid at the liquid temperature. Pressure fluctuations within the separation zone are acceptable provided that the pressure does not continuously drop or remain below the vapor pressure of the liquid at the liquid temperature during separation or drying. More preferably, the pressure drops within the separation zone do not fall below the vapor pressure of the liquid at the liquid temperature. As explained further below, however, it is preferred to provide a pressure regulator and controller to inject compressed gas into the system at a convenient location to maintain a pressure at or above the vapor pressure of the liquid and to more preferably maintain a constant +/−20 psig pressure within the separation zone.

Accordingly, the pressure within the separation zone can be maintained relatively constant by re-pressurizing the liquid at any point, such as in a re-circulation line, in a slurry line feeding the separation device, or within the separation zone. Providing a pump on a liquid re-circulation line is a convenient method for re-pressurizing the liquid. Alternatively, the flow of air in the separation zone can also be a flow of pressurizing air, thereby providing the means for re-pressurizing the liquid. In the process of the invention, however, much less energy is required to maintain the pressure of the liquid in the separation zone above the vapor pressure of the liquid than in methods which allow the pressurized slurry to be vented to the atmosphere prior to separating the liquid from the particles.

The decoupling device separates the solids from the separation device continuously. The assembly has a decoupling device 109 sealing the interior of the separation zone to retain a pressure within the separation zone above the vapor pressure of the liquid, while also moving in a motion effective to discharge the solids from the separation zone to a lower pressure environment. Examples of decoupling device assemblies to continuously discharge the solids from the inner annulus in closed system under a pressure at or above the vapor pressure of the liquid medium include rotary air lock valves 109, a t of dual knife-gate valves, ball valves, cup valves, or butterfly valves.

The decoupling device, in this case the rotary air lock 109, can be positioned at a variety of locations along the path of the solids outlet 107. The rotary air lock may begin inside and within the walls 104 of the separation device 100, contiguous to where the solids outlet meets the walls of the separation device at location 114, or it can begin outside the walls 104 of the separation device 100 as illustrated in FIG. 1. Alternatives to locating the decoupling device in a vertical pipe, the particles may be discharged from the separation device, optionally through a vertical pipe, into a chute, holding tank, or any suitable container allowing the particles to accumulate to a height, following which at measured intervals (deemed to be a continuous process since the intervals are regular) the particles are decoupled from the separation zone from the chute or tank fitted with another pipe in which is located the decoupling device, while maintaining the pressure in the separation zone above the vapor pressure of the particles. Thus, the separation zone may extend beyond the walls of the separation device.

In the case of the rotary air lock, once the air lock chamber is filled to a desired level, the first gate or ball closes and the second gate or ball opens, thereby decoupling the particles from the separation zone while maintaining the pressure in the separation zone above the vapor pressure of the particles. Other suitable valves include conventional in-line rotary valves which operate much like a revolving door to receive particles into a quadrant which spins and seals against a housing and continues to spin toward the low pressure side of a pipe releasing the particles. The rotary valve is segmented into several chambers and spins continuously to rapidly sequentially receive, seal, and discharge particles continuously at the rate corresponding to the rotor revolutions. The rotary air lock revolution per minute is coordinated with the inlet slurry velocity, the height of the separation device, the desired displacement of water through the cross-flow filter 102, and the desired particle bed 111 height Zone 2, with the primary driving factor being to optimize maximum water displacement with a short residence time of the particles in the separation device. The rotary air lock is divided into several chambers 115. As an empty chamber 115 is rotated toward the packed particles 111, a portion of the particles are accepted into the chamber. The chamber filled with particles revolves toward a lower or atmospheric pressure Zone 3 and discharged from the separation device 100. The rotary air lock assembly is sealed around to the inner walls of the discharge outlet pipe 107 to keep the separation device pressurized. The particles are discharged from the chamber 115 as it approaches Zone 3 by centrifugal forces and/or the pressure release from the chamber into Zone 3. A minor pressure drop may occur by the pressure differential between an empty chamber approaching Zone 2 and the pressure within the separation zone.

There is provided another embodiment in which thermoplastic polymer particles, preferably polyester polymer particles, containing a level of liquid moisture and at a pressure greater than atmospheric pressure at a temperature of at least 130° C. are decoupled comprising depressurizing the particles to a low pressure of less than 50 psig, wherein the particle temperature upon decoupling is greater than 100° C., preferably at least 110° C.

As illustrated in FIG. 1, because the gate assembly is located below the liquid outlet, the void volume of the particle bed exiting as solids discharge stream will be saturated with the liquid and may also be saturated with a continuous phase of liquid.

As an optional feature, a cooling medium such as water can be added into the base of the Zone 2 dense pack of polymer particles through line 116 in order to displace the hot water within the interstices of the dense particle pack that would otherwise exit with the particles through the rotary air lock 7. The addition of a cooling medium at a point above the rotary air lock 109 or any other decoupling device also serves to eliminate the possibility of a hot water flash due to the pressure drop across the rotary air lock 109. The temperature of the cooling medium fed to the densely packed particles is lower than the temperature of the water within the interstices of the particles. By displacing the hot water from the interstices of the particles, the temperature of the liquid discharge stream through the liquid outlet 105 is hotter and retained to a greater degree than in the absence of a cool water feed through line 116. It is preferred to locate the cool water feed line at a point distal from the liquid outlet 105, and at or between discharge outlet 105 and the rotary air lock 109 to provide optimal displacement of hot water from the interstices of the particles without catching up the cooling medium into the hot water flow in and through the liquid outlet 105. The amount of cooling medium required for displacement is easily calculated and controlled by knowing the rpm of the rotary valve, valve volume, and void volume in the packed particle bed. One calculates the rate of water leaving with the particles and uses this as the set point for the cooling medium controller 117.

The pressure within the separation vessel 100 may be regulated through a pressure line 118 serving as a pressure relief or a pressurizing mechanism that further aids in regulating the temperature of the water within the separator vessel 100. Pressure is controlled in the filtration system to avoid flashing when hot feed enters the separation vessel 100. A gas, preferably N2, is allowed to flow into the separation device 100 through a pressure controller to keep the pressure at or above the vapor pressure of the water in the slurry at the operating temperature. In the event the gas ($N_2$) resists entering the separation vessel and causes the pellets to accumulate at the inlet of the separation vessel and eventually plug the line, a degasser can be installed on the separation vessel to disengage the gas from the slurry and allow the gas to exit the degasser through a pressure control valve while the slurry flows into the separation vessel. The location of pressure line, although illustrated here at the top of separator vessel 100, can be anywhere in the pressurized loop of the process, including on the liquid discharge outlet 105 pipe. In the event that a degassing unit is installed, the pressure controller (valve) is advantageously located on the degassing unit at the top to the degassing device.

FIG. 2 illustrates one or more features of the third and fourth embodiments. In this illustration, the outer annulus 103 need not and is not filled with water. Instead, the outer annulus 103 contains little if any hold up water 212. The outer annulus serves primarily as a conduit for water to reach the liquid discharge outlet 205. Water accumulates within the outer annulus 203 where it is discharged through liquid outlet 205. As the slurry is fed into the separation vessel 200 through the inlet 201, the particles accumulates within the inner annulus 210 of cross-flow filter 202 to form a bed of particles 211 which is more dense than the particle density of the slurry fed to the vessel 200. As a result, water is displaced through the filter 202 into the outer annulus 203 at or above the packed bed of particles 211, and continues to be displaced as the packed bed of pellets proceeds toward the rotary air lock 209.

A key difference in this embodiment relative to that illustrated in FIG. 1 is the location of the water level line relative to a point on the filter or filter junction with the discharge outlet where it is not possible for the water to enter the particle bed, which is the terminal point of the filter. In this illustration, the porous filter has a terminal imaginary plane 220 which is a location beyond which the separated liquid cannot pass from the outer annulus 203 back through the filter into the inner annulus 210. The liquid level 212, defined as level of the pooled or accumulated liquid in the outer annulus in the outer annulus 203, is below or beyond the terminal point, depending on the orientation of the separation device or the porous filter in the separation device. The liquid level can be non-existent in the event that the feed rate and discharge rate along with the design configuration are adjusted such that no liquid is allowed to pool in the outer annulus. The portion of the inner annulus 210 from which the liquid in the outer annulus 203 can no longer pass into the inner annulus 210 is the enclosed inner annulus 221. The decoupling device is desirably located in the enclosed inner annulus 221, beyond which is the discharge outlet 207. At the top or entrance to the enclosed inner annulus 207 is the terminal point 220.

By locating the terminal point 220 of the porous filter above the liquid level line, or in the event that the separation device is horizontally oriented, locating the terminal point 220 behind the liquid level line (in a horizontal orientation with a left to right flow path, the terminal point is first followed by the water level line) the liquid in the outer annulus does not commingle with the particle bed 211 in the enclosed inner annulus 221 by flowing back through the filter from the outer annulus to the inner annulus in this region. In a device, the cross flow filter can form the boundaries of the inner annulus for receiving the flow of particles, and the inner annulus formed by the cross flow filter is connected to an enclosed inner annulus impermeable to the outer annulus and containing the particles. While some liquid separated into and falling through the outer annulus may spray or rebound back into the inner annulus through the porous filter, the water is not allowed to pool to a level which allows it to flow back through the filter into the inner annulus. As a result, the liquid volume in the particle bed feeding the rotary air lock valve 209 or other decoupling device is reduced. For example, spherical pellets with an average diameter of 0.1 inches will have a void volume of 67%. If the void volume in the close pack pellet bed is saturated with water, and the density for the pellets is 1.35 g/ml, the % solids in the packed bed will be about 60% solids. However, if only the surface of the pellets are only wetted and the void volume is essentially free of water, the packed bed will comprise at least about 97% solids. The % moisture in the packed bed within the enclosed inner annulus 221 can be as little as 0.5 volume % or less prior to discharge from the separation vessel through the rotary air lock 209. Upon discharge in the solids discharge outlet 207 beyond the rotary air lock 209, the % moisture will diminish further due to the flashing or rapid evaporation of moisture from the particles attributable to the pressure drop. The amount of moisture reduction will depend on the magnitude of the pressure drop.

In the third embodiment comprising the device, the terminal point 220 of the filter is located above the liquid outlet 205. The location of the liquid outlet is where the liquid from the outer annulus feeds into the outlet. While the outlet as illustrated in FIG. 2 is flush with the wall 204 of the separation device 200, the liquid outlet can also extend into the inner annulus as a pipe directed down into the outer annulus, or as a ring circumscribing the filter. If multiple entry points exist for feeding the liquid in the outer annulus into the liquid outlet, or if multiple liquid outlets exist, it is the first entry point, or the highest entry point or outlet which is deemed to the location of the liquid outlet.

While not illustrated, the invention also includes embodiments in which multiple porous filters separated each separated by an enclosed inner annulus is provided, so long as the terminal point, in this case the terminal portion of the last in line filter, is above the liquid level. The terminal point also does have to terminate in a plane. For example, the filter may terminate in an irregular shape, with the terminal point in this case being the point closest to the water level which is nonporous to the liquid under operating conditions. Moreover, in the process of the fourth embodiment, it is possible to locate the terminal point of the filter below the liquid discharge if the process is operated to prevent accumulating a pool of water in the outer annulus, or if water is accumulated, the water level remaining below the terminal point. If desired, the liquid outlet can be located in the outer annulus in a region most distal from the inlet, and the process is operated to balance the feed of slurry with the liquid discharge capacity. For example, in a vertically oriented device, the liquid outlet can be located at the bottom of the device such that water flowing into the outer annulus flows out the bottom of the device at a rate which prevents the pooling of water.

Another embodiment of this invention is illustrated in FIG. 3. The key difference in this embodiment to that illustrated in FIG. 2 is the tangential inlet 301 feed of slurry into the separation device 300. By side feeding the slurry into the separation device, the flow of solid particles is, for a short distance, parallel to the path of water through the porous filter 302. In this way, a large first portion of the water in the slurry flows through the porous filter 302 into the outer annulus 303 by action of the slurry flow velocity against the filter media. The remainder of the partially dewatered slurry then proceeds down the path of the cross flow filter 302 toward the packed bed 311. The partially dewatered solid particles in the slurry travel toward the packed bed in a path tangential to, or a substantially perpendicular path to, the path of the water passing through the pores of the filter 2. This embodiment combines a parallel and a tangential flow relationship of the solid particles relative to the path of water through the filter pores, and provides for a greater quantity of water separated prior to the packed bed relative to the embodiments of FIGS. 1 and 2.

What we claim is:

1. A process for separating particles from a liquid in a slurry comprising:
   a. feeding a slurry comprising solid particles and a liquid to an inlet of a separation device maintained at a pressure equal to or greater than the vapor pressure of the liquid, wherein the particles have a number average particle size having a smallest dimension in the range of 0.1 mm to 24 mm, and wherein the separation device contains a porous filter dividing the separation device into an outer annulus defined as a space between the wall of the separation device and the porous filter and an inner annulus defined as a space within the porous filter, and wherein the slurry falls through the inner annulus;
   b. contacting the slurry in the separation device with the porous filter and separating the liquid from the particles, wherein a portion of the liquid flows through the porous filter into the outer annulus, and wherein the porous filter has a terminal point beyond which the separated liquid does not pass from the outer annulus back through the porous filter to the inner annulus;
   c. accumulating none of the separated liquid in the outer annulus or accumulating the separated liquid in the outer annulus at a level below the terminal point, and continuously discharging the separated liquid from the outer annulus through a liquid outlet; and
   d. decoupling the particles from the separation device through a solids outlet using a decoupling device to a low pressure below the vapor pressure of the liquid at the liquid temperature within the separation device while maintaining a pressure on the particles prior to the decoupling at or above the vapor pressure of the liquid within the separation device, wherein the particles form a particle bed in the inner annulus and the solid volume of the particle bed feeding the decoupling device is at least 97%.

2. The process of claim 1, wherein the particles are spheroidal in shape.

3. The process of claim 1, wherein the number average particle size has the smallest dimension ranging from 1 mm to 10 mm.

4. The process of claim 1, wherein the volume percent of the particles in the slurry ranges from 5 vol. % to 60 vol. %.

5. The process of claim 1, wherein the liquid comprises water in an amount of at least 50 wt. % based on the weight of the liquid.

6. The process of claim 1, wherein the particles comprise polyester polymer particles partially crystallized to a degree of crystallinity of at least 30%.

7. The process of claim 6, wherein the liquid comprises water, and the particles are obtained by cutting a polyester polymer melt underwater and feeding the resulting slurry directly or indirectly to the separation device.

8. The process of claim 1, wherein the particles comprise polyester polymers containing alkylene terephthalate or alkylene naphthalate units.

9. The process of claim 8, wherein the particles have an It.V. of at least 0.7 dL/g.

10. The process of claim 9, wherein the particles are not solid state polymerized.

11. The process of claim 1, wherein the liquid temperature is at or exceeds the normal boiling point of the liquid at 1 atm.

12. The process of claim 11, wherein the liquid temperature exceeds 100° C.

13. The process of claim 1, wherein the pressure within the separation device is greater than 14.7 psia and less than 500 psia.

14. The process of claim 1, wherein the shape of the outer annulus is in the form of a cylinder.

15. The process of claim 1, wherein the porous filter is configured with V wedges.

16. The process of claim 1, wherein a particle flow vector of the particles flowing through the inner annulus is at an angle greater than 45° to a flow vector of the liquid flowing through the porous filter.

17. The process of claim 1, wherein the particles are continuously discharged through the solids outlet.

18. The process of claim 17, wherein the particle bed height is at a constant value.

19. The process of claim 17, wherein the particle bed height is 30% to 60% of the separation device height.

20. The process of claim 1, wherein at least 95 vol. % of the liquid in the slurry fed to the separation device is discharged through the liquid outlet.

21. The process of claim 1, wherein less than 20% of the outer annulus volume is filled with the separated liquid.

22. The process of claim 1, wherein the decoupling device comprises one or more rotary air lock valves, ball valves, knife gate valves, cup valves, or butterfly valves.

23. The process of claim 1, wherein the decoupling device is located in an enclosed inner annulus, wherein the liquid does not flow from the outer annulus.

24. The process of claim 1, wherein the liquid volume of the particle bed feeding the decoupling device is 0.5 volume % or less.

25. The process of claim 1, wherein the porous filter comprises pores and the slurry is fed through the inlet in a direction parallel to the pores.

26. The process of claim 1, wherein the particles comprise polymers containing ethylene terephthalate units.

27. The process of claim 26, wherein the It.V. of the particles prior to the decoupling is at least 0.70 dL/g without advancing the particle molecular weight in the solid state.

28. A separation device comprising:
   a. an inlet for continuously receiving a feed of slurry comprising solid particles and a liquid;
   b. a porous filter disposed within the separation device to form an outer annulus receiving a portion of the liquid separated from the particles, the outer annulus defined as a space between the wall of the separation device and the porous filter and an inner annulus defined as a space within the porous filter, the porous filter having a terminal point beyond which the separated liquid does not pass from the outer annulus back through the porous filter to the inner annulus;
   c. a liquid outlet located on the separation device for discharging at least a portion of the separated liquid from the outer annulus, wherein the terminal point is located above the liquid outlet;
   d. a solids outlet for discharging the particles, and
   e. a decoupling device sealed to the solids outlet through which the particles are discharged and under which a pressurized environment within the separation device is maintained at or above the vapor pressure of the liquid.

29. The device of claim 28, wherein the porous filter is cylindrical.

30. The device of claim 28, wherein the porous filter is oriented such that a particle flow through the inlet will have a particle flow vector at an angle greater than 45° to a flow vector of the liquid through the porous filter.

31. The device of claim 28, wherein the decoupling device comprises rotary air lock valves, ball valves, knife gate valves, cup valves, or butterfly valves.

32. The device of claim 28, wherein the decoupling device is located in an enclosed inner annulus into which the liquid does not flow from the outer annulus.

33. The device of claim 28, wherein the inlet is on the side of the separation device.

34. A separation device comprising:
   a. an inlet for continuously receiving a feed of slurry comprising solid particles and a liquid;
   b. a porous cross-flow filter comprising a microfilter, nanofilter, ultrafilter, or reverse osmosis filter, wherein the cross-flow filter comprises pore openings having an average pore size, disposed within the separation device to form an outer annulus, defined as a space between the wall of the separation device and the cross-flow filter to receive the liquid separated from the particles, and an inner annulus, defined as a space within the cross-flow filter, the inlet and the cross-flow filter oriented such that the particles entering the separation device through the inlet flow tangentially to the pore openings of at least a portion of the cross-flow filter, wherein the average pore size is smaller than a number average solid particle size of the particles in its smallest dimension, and wherein the cross-flow filter has a terminal point beyond which the separated liquid does not pass from the outer annulus back through the cross-flow filter to the inner annulus;
   c. a liquid outlet located on the separation device for discharging at least a portion of the separated liquid from the outer annulus;
   d. a solids outlet for discharging the particles, and
   e. a decoupling device through which the particles are discharged synchronous to the motion of the gate, the decoupling device providing a seal to maintain a pressurized environment within the separation device above the vapor pressure of the liquid.

35. The device of claim 34, wherein the cross-flow filter contains a thin film polymeric membrane filter media, ceramic filter media, hollow fiber media, or sintered metal filter media.

36. The device of claim 34, wherein the cross-flow filter is cylindrical.

37. The device of claim 34, wherein the cross-flow filter is oriented such that the particles flow through the inlet having a particle flow vector at an angle greater than 45° to a flow vector of the liquid through the cross-flow filter.

38. The device of claim 34, wherein the decoupling device comprises rotary air lock valves, ball valves, knife gate valves, cup valves, or butterfly valves.

39. The device of claim 34, wherein the decoupling device is located in an enclosed inner annulus into which the liquid does not flow from the outer annulus.

40. The device of claim 34, wherein the inlet is on the side of the separation device.

41. The device of claim 34, wherein the average pore size is 1 micron or less.

42. A process for separating particles from a liquid comprising:
   a. feeding a slurry, comprising solid particles and a liquid, at a liquid temperature at or above the normal boiling point of the liquid and under a pressure of greater than the vapor pressure of the liquid through an inlet of a separation device into the separation device maintained at a pressure greater than the vapor pressure of the liquid, wherein the particles have a number average particle size having a smallest dimension in the range of 0.1 mm to 24 mm, and wherein the separation device contains a cross-flow filter dividing the separation device into an outer annulus defined as a space between the wall of the separation device and the cross-flow filter and an inner annulus defined as a space within the cross-flow filter, and wherein the slurry falls through the inner annulus;
   b. contacting the slurry against the cross-flow filter comprising a microfilter, nanofilter, ultrafilter, or reverse osmosis filter, disposed within the separation device to separate the liquid from the solid particles, wherein the solid particles move in a direction tangential to the flow of the liquid across the cross-flow filter, wherein the separated liquid flows into the outer annulus, the cross-flow filter having a pore size which is smaller than the number average solid particle size in its smallest dimension, and wherein the cross-flow filter has a terminal point beyond which the separated liquid does not pass from the outer annulus back through the cross-flow filter to the inner annulus;
   c. discharging the separated liquid from the outer annulus through a liquid outlet;
   d. discharging the solid particles from the separation device using a decoupling device while maintaining a pressurized environment within the separation device, and wherein the particles form a particle bed in the inner annulus and the solid volume of the particle bed feeding the decoupling device is at least 97%.

43. The process of claim 42, wherein the particles are spheroidal in shape.

44. The process of claim 42, wherein the number average particle size has the smallest dimension ranging from 1 mm to 10 mm, the volume percent of solids in the slurry ranges from 5 vol. % to 60 vol. %, the liquid comprises water in an amount of at least 50 wt. % based on the weight of the liquid, and the solid particles fed to the separation device comprise thermoplastic polymers.

45. The process of claim 42, wherein the solid particles comprise polyester polymers.

46. The process of claim 42, wherein the solid particles comprise polyester polymers containing alkylene terephthalate or alkylene naphthalate units.

47. The process of claim 42, wherein the solid particles have an It.V. of at least 0.7 dL/g.

48. The process of claim 42, wherein the molecular weight of the solid particles is not advanced in the solid state prior to the discharging of the solid particles.

49. The process of claim 42, wherein the liquid temperature exceeds 100° C.

50. The process of claim 42, wherein the pressure within the separation device is 50 psia or more.

51. The process of claim 42, wherein the shape of the outer annulus is in the form of a cylinder.

52. The process of claim 42, wherein a flow vector of the solid particles is at an angle greater than 45° to a flow vector of the liquid through the cross-flow filter.

53. The process of claim 42, wherein the solid particles are continuously discharged through the decoupling device.

54. The process of claim 42, wherein at least 95 vol. % of the liquid fed to the separation device is discharged through the liquid outlet.

55. The process of claim 42, wherein less than 20% of the outer annulus volume is filled with the separated liquid.

56. The process of claim 42, wherein the decoupling device comprises-a rotary air lock valves, ball valves, knife gate valves, cup valves, or butterfly valves.

57. The process of claim 42, wherein the solid particles comprise polyester polymer particles partially crystallized to a degree of crystallinity of at least 30%.

58. The process of claim 57, wherein the liquid comprises water, and the solid particles are obtained by cutting a polyester polymer melt underwater to produce the slurry, wherein the slurry is fed directly or indirectly to the separation device.

* * * * *